Patented Oct. 11, 1938

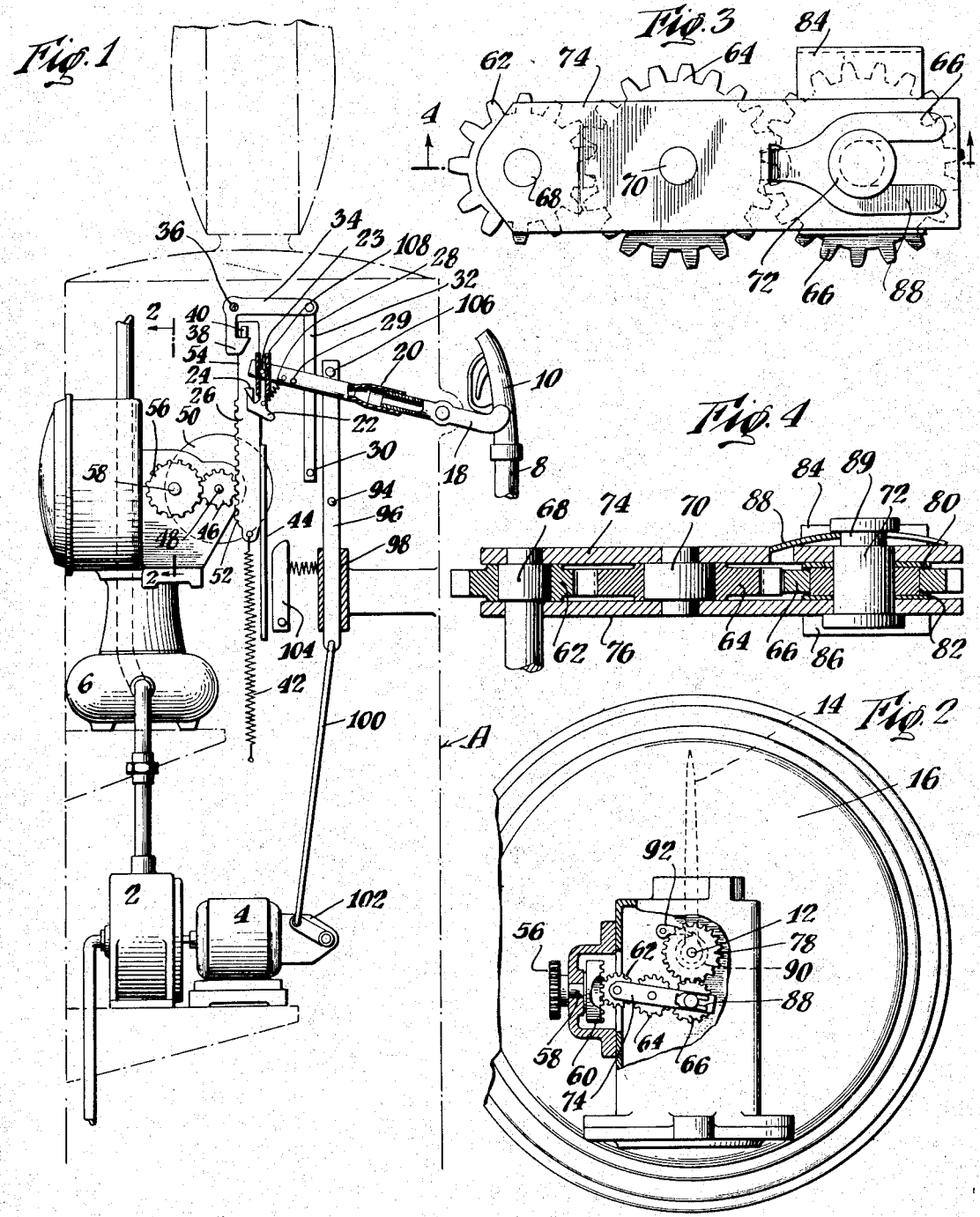

2,132,637

UNITED STATES PATENT OFFICE 2,132,637

AUTOMATIC ZEROIZING DEVICE FOR DISPENSING PUMPS

William L. Marden, Jackson Heights, Long Island, N. Y., assignor to Neptune Meter Company, a corporation of New Jersey Application June 2, 1936, Serial No. 83,037

17 Claims. (Cl. 221—95)

The present invention relates to control mechanisms for dispensing devices of the type commonly used in gasoline filling stations.

This type of gasoline dispensing device consists of a pump, usually operated by an electric motor, which forces the liquid to a meter of any one of a number of types, the meter operating a register which indicates the quantity of fluid or the cost of the fluid dispensed in each dispensing operation. The registers of these dispensing devices are usually provided with a means for returning them to zero position after a dispensing operation is concluded so that the amount of liquid dispensed in a subsequent dispensing operation will accurately be indicated on the register.

Some of the resetting mechanisms which are used with dispensing pumps are merely manually operated handles or knobs connected to the registering indicator. Others interlock with the switch controlling the pump motor, and are so arranged that the motor and pump cannot be started until the register has reacher zero position.

Some of the interlocking types of resetting mechanisms use weight or spring operated means to return the indicator to zero. These resetting mechanisms act simultaneously with return of the indicator toward zero position or subsequent thereto, to initiate operation of the pump. In this type of device the spring or weight actuated mechanism is directly connected to the register and because the register is driven directly by the meter, the energy for lifting the weight or winding the spring must be derived from the meter. As a result, because of the increased resistance to movement of the elements of the meter, it has been found that there is some slippage of liquid in the meter and the meter is rendered inaccurate in operation.

The present invention includes an automatic means for resetting the indicator which relieves the meter of the load of supplying the energy which is later used in the resetting operation, and overcomes the necessity of providing manually actuated means for returning the indicator to zero.

My resetting mechanism preferably is so arranged with relation to the pump actuating means or motor, that movement of one control member sequentially causes the indicator to be reset and the pump to be started to dispense liquid. The single control which causes this sequential operation may also act as a means for supplying energy to the resetting mechanism independently of the meter and thus relieves the meter of the load of supplying the energy to the energy storing means.

More specifically a preferred form of the invention includes the use of a flywheel which is actuated by a spring urged rack member, the flywheel being connected to the register only during the resetting operation and being released from the register during a dispensing operation so that the meter may drive the register entirely independently of the operation of the flywheel.

In order to provide a means for automatically placing the rack under spring tension, the usual hose support is constructed to move the rack against the tension of the spring when the hose is placed upon the hose support at the conclusion of a dispensing operation. The hose support is also utilized in its movement to move a switch through which electric energy is supplied to the motor to "off" and "on" position, thereby controlling the operation of the pump.

For a better understanding of the present invention, reference may be had to the accompanying drawing, in which:

Figure 1 is a view of a dispensing pump, partly in section and partly broken away showing typical automatic resetting and pump actuating means embodying the present invention;

Figure 2 is a view in section and partly broken away, taken on line 2—2 of Figure 1;

Figure 3 is an enlarged view of a gear train adapted for use in the resetting mechanism of Figure 1, and Figure 4 is a view in section, taken on line 4—4 of Figure 3.

Illustrative of the invention, Figure 1 discloses a dispensing pump having a housing and framework A. Mounted in the housing A is a pump 2, actuated by a motor 4 for forcing liquid from a source of supply (not shown) to a meter 6 for measuring the liquid as it passes therethrough to the dispensing hose 8, which is provided with hand controlled dispensing nozzle 10. Operation of the meter 6, on passage of the liquid therethrough is transmitted by any suitable means to an indicator shaft 12, Figure 2, carrying indicator pointer 14, thereby moving the latter around the dial 16 in accordance with the flow of the liquid. The meter 6 is connected to the indicator shaft 12 by means of a friction clutch (not shown), in order that the indicator shaft 12 may be moved when the meter 6 is stopped, for returning indicator hand 14 to its initial or zero position.

In order to return the indicator hand 14 to zero position, after a dispensing operation has been completed, a support 18 for the hose nozzle 10 is utilized as a control means, although other means may be utilized with equal facility. Hose support 18 is pivotally mounted for oscillatory movement in framework A and carries at its inner end a telescoping relatively slidable extension 20. When the hose nozzle 10 is removed from support 18, and the support 18 is forced upwardly, extension 20 moves downwardly and hook 22 pivotally mounted on pin 23 on extension 20 is swung counterclockwise out of engagement with triangular lug 24 on rack 26 by tension spring 28 against the stop 29 on the extension. Further downward movement of extension 20 causes it to strike pin 30 on link 32 and to rock bell crank lever 34 clockwise about its pivot 36, thereby displacing latch 38 from beneath lug 40 on rack 26. The rack is then moved downwardly by tension spring 42 and is guided in its movement by guide plate 44 and by engagement with idler pinion 46 fixed to shaft 48 which also carries a flywheel 50.

Rack 26 is provided with teeth 52 along only a portion of its length, a portion 54 of the upper end of the rack being left blank, so that downward movement of the rack spins the flywheel 50 by engagement of rack teeth 52 with pinion 46, until the blank portion 54 moves adjacent the pinion 46, after which the flywheel 50 continues to spin of its own inertia. At the same time the pivoted hook 22 is moved into position beneath the triangular lug 24 by the spring pressed cam 104, to connect the arm 20 to the slide 26 for returning the same.

As the flywheel 50 spins, it rotates through idler pinion 46, the gear 56 fixed to one end of shaft 58 and crown gear 60 fixed to the opposite end of shaft 58. Crown gear 60 in turn rotates pinions 62, 64 and 66 which are mounted in shafts 68, 70 and 72 respectively, extending between plates 74 and 76. The construction and operation of this mechanism is substantially the same as that shown in the copending application of Charles S. Hazard, Serial No. 747,379, now Patent No. 2,120,645 granted June 14, 1938. Plates 74 and 76 are pivotally mounted on shaft 68 so that they are capable of oscillation about said shaft. As crown gear 60 rotates, it turns pinions 62, 64 and 66 and causes the plates 74 and 76 to swing in a counterclockwise direction so that pinion 66 engages and meshes with gear 78 frictionally mounted on indicator shaft 12, thus returning the indicator hand towards zero. Oscillation of the plates 74, 76 and the pinions 64 and 66, is brought about by means of friction plates 80 and 82 mounted on shaft 72 between the pinion 66 and the plates 74 and 76 respectively, thereby creating a resistance to the rotation of pinion 66 and causing the entire pinion train to swing. The plates 74 and 76 are provided with flared edges 84 and 86 for guiding the pinion 66 into engagement with gear 78, and they are held in close frictional engagement with the gear 60 by means of a bifurcated spring member 88 engageable with plate 74 and a groove 89 in shaft 72.

When the indicator hand 14 returns to zero, it is stopped by engagement of a single-tooth ratchet 90 fixed on shaft 12 with a pawl 92 carried by the dial 16. As the latter part of the resetting operation may be largely effected by the free rotation of flywheel 50, the excess energy is dissipated in the frictional mounting of gear 78 on shaft 12.

Movement of hose support 18 may also be utilized to start the motor 4 driving pump 2. As the extension 20 continues to move downwardly it engages pin 94 on slide 96 guided in bore 98 on the frame A. Downward movement of slide 96 is transmitted through link 100 to switch 102 moving it to "on" position and actuating the motor 4 and pump 2 to force fluid through the meter 6 as previously described.

In order to restore the resetting mechanism to the position disclosed in Figure 1, after a dispensing operation has taken place, the nozzle 10 need only be restored to support 18. With the extension 20 in its lowermost position, hook 22 pivotally mounted thereon is urged in a clockwise direction against the tension of spring 28 by spring urged cam 104 into engagement with triangular lug 24 on rack 26. As the extension moves upwardly under the weight of hose 8 and dispensing nozzle 10, the rack 26 is lifted upwardly against the tension of spring 42 until the bell crank latch 38 engages under lug 40, thereby locking the rack 26 in its upper position, as shown in Figure 1. The extension 20 in its upward movement also engages lug 106 on slide 96, moving it upwardly and moving switch 102 to "off" position.

The extension 20 is guided in its upward and downward movements by straight parallel guide bars 108 (Figure 1), which engage opposite sides of pin 23 to translate the oscillatory movement of the extension 20 into a vertical straight line movement of its outer end.

It is believed that the operation of the device will be clear from the foregoing description, but a brief résumé of the sequence of operations taking place is as follows:

With the elements in the position shown in Figure 1, a dispensing operation has been completed, the motor 4 and pump 2 are not operating and the indicator hand 14 is at the reading of the quantity of liquid dispensed in the preceding operation.

To dispense a further quantity of liquid, the dispensing nozzle 10 is removed from the support 18, and the latter is forced upwardly, moving extension 20 downwardly. Hook 22 swings out of engagement with triangular lug 24 and further downward movement of extension 20 trips latch 38, releasing rack 26 for downward movement, thereby actuating the flywheel 50. The flywheel actuates gear trains 46, 56, 60, 62, 64, 66 and 78 to return the indicator hand 14 to zero position, the flywheel continuing to spin until the ratchet tooth 90 engages pawl 92 to stop the indicator hand 14 at zero position. The flywheel 50 is then brought to a stop by dissipation of energy through the frictional mounting of gear 78 on shaft 12. During the resetting operation just described, the indicator shaft 12 is permitted to move relatively to the meter 6, by the friction clutch connection between them.

Also immediately after the latch 40 has been tripped to initiate the resetting operation, further downward movement of the extension causes the switch 102 to be moved to "on" position causing the motor 4 and pump 2 to operate. When the indicator hand reaches zero, the valve in the dispensing nozzle 10 may be opened to dispense liquid.

When the nozzle 10 is returned to the support 18, hook 22 lifts rack 26 into the position shown in Figure 1, permitting latch 38 to engage projection 40 to hold the rack in its raised position. At the same time the extension 20 engages pin 106 on slide 96 to raise the slide and move the switch to "off" position.

The term "inertia member", hereinafter used, refers to a flywheel or a similar body having such mass that it will have sufficient inertia after being placed in motion to return the indicator to zero position without the aid of an exterior source of power.

It will be apparent that there can be many uses for the devices disclosed, and that there can be variations in the construction of the various elements of the device, and therefore, the disclosure should be considered as illustrative only and not as limiting the scope of the appended claims.

I claim:

1. In a liquid dispensing device having a register movable away from an initial position in proportion to the quantity of liquid dispensed; the combination with the register of means for resetting the register to said initial position comprising a flywheel operatively connected to the register during the resetting operation only, and means for energizing the flywheel at the beginning of the resetting operation.

2. In a liquid dispensing device having a register movable away from initial position in proportion to the quantity of liquid dispensed; the combination with the register of means for resetting the register to said initial position comprising a flywheel operatively connected to the register during the resetting operation only, and a spring urged rack for rotating the flywheel at the beginning of the resetting operation.

3. In a liquid dispensing device having a register movable away from an initial position in proportion to the quantity of liquid dispensed; the combination with the register of means for resetting the register to said initial position comprising a flywheel operatively connected to the indicator during the resetting operation only, a movable rack for rotating the flywheel at the beginning of the resetting operation, means urging the rack to rotate the flywheel and releasable means for latching the rack against movement by said urging means.

4. In a liquid dispensing device having means for forcing liquid and a register movable away from initial position in proportion to the quantity of liquid dispensed; the combination of means for initiating operation of the liquid forcing means, means for resetting the register to said initial position including a flywheel operatively connected to the register during the resetting operation only, releasable means for energizing the flywheel at the beginning of a resetting operation, and means for first releasing the energizing means to reset the register to zero and then actuating the initiating means to operate the liquid forcing means.

5. In a liquid dispensing device having a register movable away from initial position in proportion to the quantity of liquid dispensed; the combination with the register of means for resetting the register to said initial position comprising a flywheel, a movable rack operatively connected to the flywheel, means for moving the rack to rotate the flywheel, and means operative only during the resetting of the register to zero for connecting the flywheel to the register.

6. In a liquid dispensing device having a register movable away from an initial position in proportion to the quantity of liquid dispensed; the combination with the register of means for resetting the register to said initial position comprising a flywheel, energy storing means for rotating the flywheel, means operatively connecting the flywheel to the register only during the resetting operation, and manually operable means for supplying energy to the energy storing means.

7. In a liquid dispensing device having a meter, means for forcing liquid through the meter and a register responsive to the operation of the meter movable away from an initial position in proportion to the quantity of liquid dispensed; the combination of means for resetting the register to said initial poistion comprising energy storing means operatively connected to the register during the resetting operation only, and manually operable means for successively initiating operation of the resetting means and liquid forcing means, and thereafter supplying energy to the energy storing means.

8. In a liquid dispensing device having means for forcing liquid and a register movable away from an initial position in proportion to the quantity of liquid dispensed; the combination of means for resetting the register to said initial position comprising energy storing means operatively connected to the register during resetting only, and movable manually operable means for successively initiating operation of the energy storing and the fluid forcing means upon movement in one direction, and supplying energy to the energy storing means, and terminating operation of the fluid forcing means on movement in the opposite direction.

9. In a resetting mechanism for registers, the combination of a register, and means for resetting the register comprising an inertia member operatively connected to the register during resetting, energy-storing means for energizing the inertia member and means for supplying energy to and controlling operation of the energy-storing means.

10. In a resetting mechanism for a register, the combination of a register and means for resetting the register comprising an inertia member operatively connected to the register during resetting, movable energy-storing means for energizing the inertia member, means for retaining the energy-storing means in energy-storing position and means for successively releasing the retaining means to allow the energy-storing means to energize the inertia member and for restoring the energy-storing means to energy-storing position.

11. In a liquid dispensing device, the combination of a register movable away from an initial position in proportion to the quantity of liquid dispensed, means for initiating a dispensing operation, and means for resetting the register to initial position prior to initiation of a dispensing operation comprising an inertia member operatively connected to the register during resetting, energy-storing means for energizing the inertia member, and means for successively supplying energy to and controlling operation of the energy-storing means and actuating the initiating means.

12. In a liquid dispensing device having an indicator movable away from an initial position in proportion to the quantity of liquid dispensed; the combination of means for resetting the indicator to zero comprising energy storing means connected to the indicator only during the resetting operation, a latch for retaining the resetting means in energy storing position, means for actuating said latch to release said resetting means to reset said indicator to zero, said latch actuating means being operable to supply energy to said energy storing means after the indicator has been reset and to initiate a dispensing operation after actuating said latch.

13. In a liquid dispensing device, the combination of an indicator, means for initiating and terminating a dispensing operation, means for resetting the indicator comprising an inertia member, means for storing energy, means to release the energy storing means to actuate the inertia member and manually operable means operatively connected to the initiating and terminating means and to the releasing means for terminating a dispensing operation, supplying energy to said energy storing means, releasing the energy storing means to reset the indicator and thereafter initiating a subsequent dispensing operation.

14. In a liquid dispensing device, having means for initiating and terminating a dispensing operation, an indicator movable away from an initial position in proportion to the liquid dispensed, means for resetting the indicator to the initial position, comprising energy storing means and coacting means for connecting and disconnecting said energy storing means to the indicator during resetting and dispensing operations, respectively, and a manually operable element operatively connected to said energy storing means and initiating means for successively and sequentially releasing the energy storing means to reset the indicator, initiating a dispensing operation, terminating a dispensing operation and re-engaging the energy storing means to restore same to energy-storing condition.

15. In a liquid dispensing device, the combination of an indicator movable away from an initial position in proportion to the quantity of liquid dispensed, means for initiating and terminating a dispensing operation, means for resetting the indicator to initial position comprising energy-storing means and means for automatically connecting the energy-storing means to the indicator during resetting, and a manually operable element operatively connected to the initiating and terminating means and the resetting means for sequentially terminating a dispensing operation, supplying energy to the energy-storing means, actuating the energy-storing means to reset the indicator to initial position and initiate a dispensing operation.

16. In a liquid dispensing device, the combination of an indicator movable away from an initial position in proportion to the quantity of liquid dispensed, means for initiating and terminating a dispensing operation, means for resetting the indicator to initial position comprising a fly-wheel operatively connected to the indicator during resetting, means for energizing the fly-wheel at the beginning of a resetting operation and means operatively connected with the initiating and terminating means and the energizing means for terminating a dispensing operation and thereafter actuating the energizing means to reset the indicator to initial position prior to a subsequent dispensing operation.

17. In a liquid dispensing device, the combination of an indicator movable away from an initial position in proportion to the quantity of liquid dispensed, means for initiating a dispensing operaton, means for resetting the indicator to initial position comprising energy-storing means for supplying energy to reset the indicator to initial position, means for releasably retaining the energy-storing means in energy-storing condition and a manually operable element operatively connected to the initiating means and the energy-storing means for supplying energy to the energy-storing means to place it in energy-storing condition under control of the retaining means and for successively releasing the retaining means to permit the energy-storing means to reset the indicator and actuating the initiating means.

WILLIAM L. MARDEN.